(12) United States Patent
Martino et al.

(10) Patent No.: US 10,007,273 B2
(45) Date of Patent: Jun. 26, 2018

(54) VARIABLE FREQUENCY DRIVE FOR A FLUID-HANDLING SYSTEM

(71) Applicant: Cameron International Corporation, Houston, TX (US)

(72) Inventors: Jerry Martino, Houston, TX (US); Ghulam A. Barkatally, Spring, TX (US); Jared McClain, Katy, TX (US)

(73) Assignee: Cameron International Corporation, Houston, TX (US)

( * ) Notice: Subject to any disclaimer, the term of this patent is extended or adjusted under 35 U.S.C. 154(b) by 0 days. days.

(21) Appl. No.: 15/141,649

(22) Filed: Apr. 28, 2016

(65) Prior Publication Data

US 2017/0315566 A1    Nov. 2, 2017

Related U.S. Application Data

(60) Provisional application No. 62/328,511, filed on Apr. 27, 2016.

(51) Int. Cl.
*F16K 31/02*    (2006.01)
*G05D 7/06*    (2006.01)
(Continued)

(52) U.S. Cl.
CPC ............ *G05D 7/0635* (2013.01); *E21B 34/00* (2013.01); *E21B 34/02* (2013.01); *F16K 1/12* (2013.01);
(Continued)

(58) Field of Classification Search
CPC ....... G05D 7/0635; F16K 1/12; F16K 31/046; F16K 31/047; E21B 34/02;
(Continued)

(56) References Cited

U.S. PATENT DOCUMENTS

| 4,428,398 A | * | 1/1984 | Mito | ...................... F16K 17/06 |
| | | | | 137/530 |
| 4,665,938 A | * | 5/1987 | Brown | ................... G05D 7/005 |
| | | | | 137/486 |

(Continued)

FOREIGN PATENT DOCUMENTS

| WO | 2010008398 A1 | 1/2010 |
| WO | 2011094084 A2 | 8/2011 |
| WO | 2013079453 A1 | 6/2013 |

OTHER PUBLICATIONS

E-Choke, Mi Swaco, The E-Choke Drilling Choke from M-I SWACO is the Latest Evolution of a Proven Idea, a Remotely Operated, Electronically Actuated, Variable-Speed Version of the SUPERCHOKE Drilling Choke, 2014, pp. 1-2.

(Continued)

*Primary Examiner* — Minh Le
(74) *Attorney, Agent, or Firm* — Fletcher Yoder, P.C.

(57) ABSTRACT

A system includes a choke valve, an actuator configured to adjust a position of the choke valve, a variable frequency drive configured to adjust a speed at which the actuator adjusts the position of the choke valve, and a controller configured to receive first feedback indicative of a fluid pressure upstream of the choke valve, compare the first feedback to a first predetermined pressure range, and instruct the variable frequency drive to send electricity to the actuator at a first frequency when the first feedback is outside of the first predetermined pressure range, where the variable frequency drive is configured to control a speed and a direction of the actuator such that the actuator adjusts the position of the choke valve to a first position at a first speed, and where the first speed is based at least on a difference between the first feedback and the first predetermined pressure range.

17 Claims, 11 Drawing Sheets

(51) Int. Cl.
*E21B 34/02* (2006.01)
*F16K 1/12* (2006.01)
*F16K 31/04* (2006.01)
*E21B 34/00* (2006.01)

(52) U.S. Cl.
CPC ............ *F16K 1/123* (2013.01); *F16K 31/046* (2013.01); *F16K 31/047* (2013.01)

(58) Field of Classification Search
CPC ......... Y10T 137/7761; Y10T 137/7762; Y10T 137/7764
USPC ........... 137/487.7, 488, 489, 487.5; 166/370, 166/373, 374, 66.6; 251/129.04, 129.11, 251/129.13
See application file for complete search history.

(56) References Cited

U.S. PATENT DOCUMENTS

| | | | | |
|---|---|---|---|---|
| 4,791,954 A * | 12/1988 | Hasegawa | ............ | G05D 16/202 137/487.5 |
| 4,971,099 A * | 11/1990 | Cyvas | ..................... | E21B 34/02 137/270 |
| 5,029,597 A * | 7/1991 | Leon | ..................... | F16K 31/046 137/1 |
| 6,782,949 B2 * | 8/2004 | Cove | ..................... | E21B 33/035 137/554 |
| 6,984,004 B2 * | 1/2006 | Breitenbacher | ........... | B60T 8/36 137/47 |
| 7,287,739 B2 * | 10/2007 | Arnison | .................. | E21B 34/02 251/14 |
| 7,426,938 B2 * | 9/2008 | Bohaychuk | ............. | E21B 34/02 137/625.33 |
| 8,297,588 B2 * | 10/2012 | Ohuchi | ................. | F16K 31/047 251/129.12 |
| 8,523,141 B2 * | 9/2013 | Elliott | ..................... | F16K 47/08 251/127 |
| 8,584,698 B2 * | 11/2013 | Brun | ........................ | F01L 9/04 137/47 |
| 8,887,748 B2 * | 11/2014 | Pucher | ............... | G05D 16/2093 137/12 |
| 8,915,261 B2 * | 12/2014 | Kanomata | .............. | B01D 15/40 137/486 |
| 9,027,588 B2 * | 5/2015 | Kusunoki | .......... | G05D 16/2013 137/487.5 |
| 9,458,941 B2 * | 10/2016 | Bohaychuk | ............. | F16K 3/246 |
| 2002/0067149 A1 | 6/2002 | Moeller et al. | | |
| 2005/0205819 A1 * | 9/2005 | Morrison | ............... | F16K 47/023 251/129.13 |
| 2013/0256570 A1 * | 10/2013 | McHugh | ............... | F16K 31/122 251/30.01 |
| 2016/0186526 A1 * | 6/2016 | Elliott | ..................... | E21B 34/02 166/377 |
| 2017/0058633 A1 * | 3/2017 | Elliott | ..................... | E21B 21/10 |

OTHER PUBLICATIONS

Tolomatic Excellence in Motion, IMA Integrated Motor Rod-Style Actuator, Endurance Technology, Linear Solutions Made Easy, 2016, pp. 1-24, www.tolomatic.com for the most up-to-date technical information.
PCT International Search Report & Written Opinion for PCT Application No. PCT/US2017/029934 dated Jul. 5, 2017; 11 Pages.

* cited by examiner

VARIABLE FREQUENCY DRIVE FOR A FLUID-HANDLING SYSTEM

CROSS-REFERENCE TO RELATED APPLICATION

This application claims benefit of U.S. Provisional Patent Application No. 62/328,511, filed Apr. 27, 2016, entitled "VARIABLE FREQUENCY DRIVE FOR A FLUID-HANDLING SYSTEM," which is incorporated by reference herein in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. According, it should be understood that these statements are to be read in this light, and not as admissions of prior art.

In certain fluid-handling systems, such as mineral extraction systems, a variety of flow control devices are used to control a flow rate, a pressure, and other parameters of fluid flow. For example, in mineral extraction systems, choke valves may be utilized to regulate the flow of production fluid (e.g., oil, gas, water, and/or drilling fluids) from a well. These valves may include a choke body with a movable valve member (e.g., a choke trim) disposed therein. An actuator drives the movable valve member over an opening of the choke body through which the fluid flows. Shifting the position of the movable valve member relative to the opening adjusts the flow rate of the fluid through the opening. Unfortunately, traditional systems may be configured to shift the position of the movable member at a single drive speed, such that control over the flow rate and/or pressure of the fluid may be imprecise.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
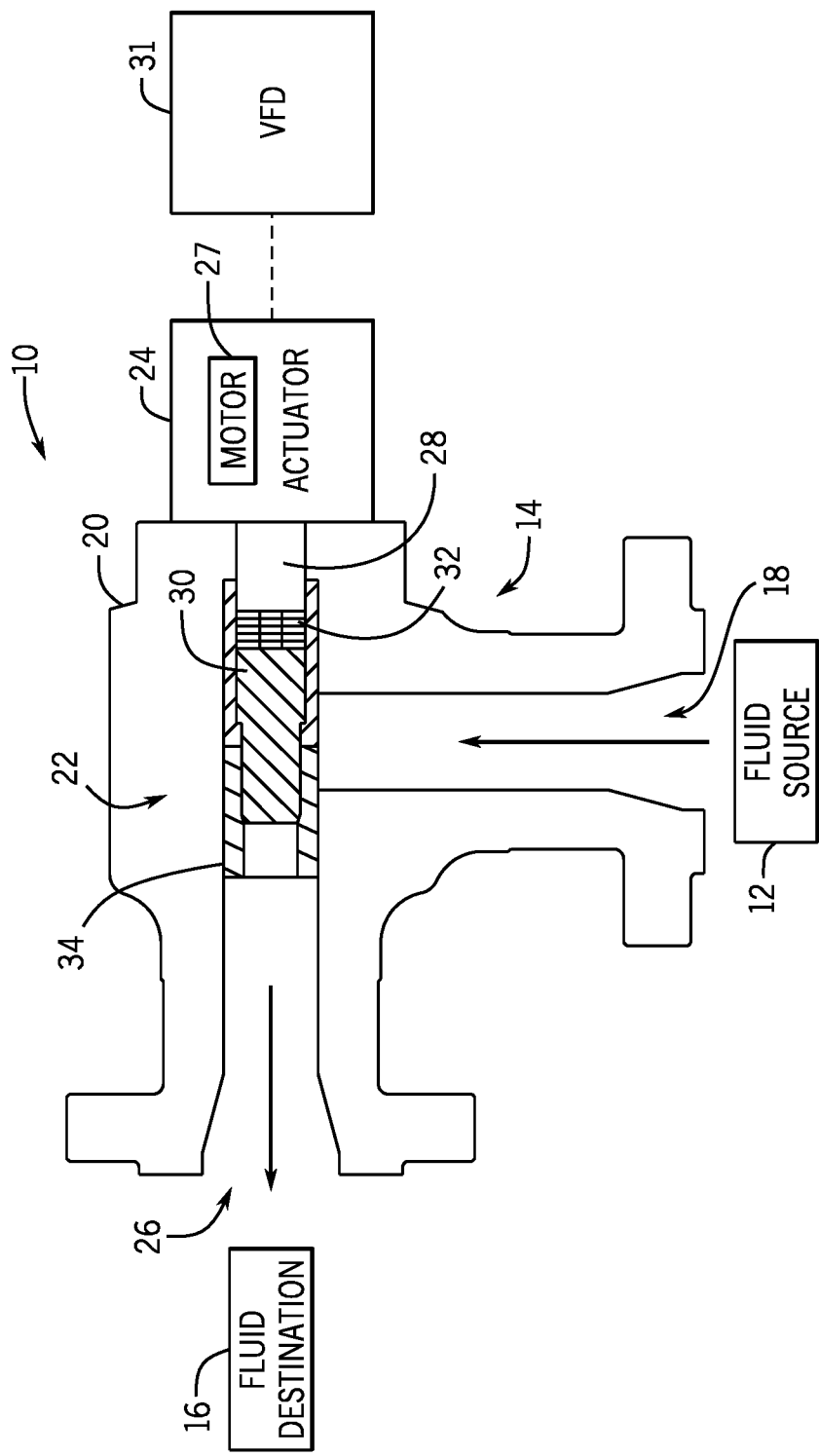
FIG. 1 is a schematic of a fluid-handling system including a choke valve that may be adjusted with a variable frequency drive (VFD), in accordance with an aspect of the present disclosure.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

As discussed in detail below, the disclosed embodiments include a fluid-handling system (e.g., a choke valve, a gate valve, a ball valve, or a combination thereof) that may be adjusted using a variable frequency drive (VFD). As used herein, a VFD may be a controller that drives an actuator by adjusting a frequency supplied to the actuator. Accordingly, the actuator speed may vary as the frequency signal delivered to the actuator from the VFD varies. Fluid-handling systems may include a choke valve that includes a choke body and a choke trim disposed within the choke body. The choke trim may include a choke plug configured to move relative to an opening in the choke valve to adjust a fluid flow through the choke valve. The choke trim may also include a stem coupled to an actuator that may be configured to move the choke plug with respect to the opening, thereby adjusting a cross-sectional area of a fluid flow path extending through the choke body to adjust the fluid flow. The actuator may be coupled to or include a drive or a motor, which may supply power to the actuator to move the choke plug with respect to the opening. However, in certain fluid-handling systems, the motor may be configured to output a constant amount of power, thereby allowing the actuator to move the choke plug at a single speed.

As drilling technologies become more advanced, it may be desirable to control a speed at which the actuator adjusts a position of the choke plug. For example, managed pressure drilling (MPD) is a technique that monitors and controls a pressure in a wellbore by diverting drilling fluids away from a drill string toward a flow control device (e.g., a choke valve). Accordingly, precise adjustments of the flow control device may provide enhanced pressure control of the drilling fluid in the wellbore, thereby enhancing drilling operations.

In order to control a speed at which the choke valve position is adjusted, a variable control device (VFD) may be coupled to a motor included in the actuator through a wired connection. For example, the VFD may send electricity to the motor of the actuator at an adjusted frequency to the motor, thereby affecting a speed at which the motor operates. Changing the speed of the motor thus changes the speed at which the actuator may adjust the position of the choke plug. Accordingly, the VFD sends electricity at a predetermined frequency to the actuator (e.g., the motor included the actuator) such that the speed of the motor, and thus the speed of the actuator, reaches a desired speed. Including the VFD to control the choke valve may thus enable the choke valve to open and/or close at different speeds.

In some cases, it may be desirable to close the choke valve quickly to block a flow of the drilling fluid toward a drilling rig platform, for example. Additionally, when utilizing MPD techniques, it may be desirable to quickly adjust a position of the choke plug when an abrupt change in pressure in the wellbore occurs. In other cases, it may be desirable to slowly adjust the position of the choke plug as pressure in the wellbore gradually changes (e.g., changes in pressure that are not rapid or unexpected). For example, it may be desirable to adjust the speed at which the position of the choke plug is adjusted in real time based on feedback received from one or more sensors. Further, the position of the choke valve may be adjusted using the VFD in accordance with nonlinear speed profiles configured to open and/or close the choke valve based on geometries of the choke valve, characteristics of the fluid flowing through the choke valve, and/or feedback received from other components of the fluid-handling system (e.g., pressure, flow rate, etc.). Accordingly, utilizing the VFD to control the choke valve may enable precise control (e.g., quick open and/or close or slow open and/or close) over a flow rate of fluid through a fluid-handling system.

Moreover, the VFD may be connected to (e.g., wirelessly or through a wired connection) an existing communications bus of a drilling system, which may include one or more controllers. Accordingly, the VFD may be positioned remote from the actuator, and thus distant from the harsh conditions that may be present in a wellbore. Additionally, electricity at a predetermined frequency sent by the VFD may be sent based on feedback received from other components and/or devices of the drilling system that may include the fluid-handling system. In other embodiments, the VFD may control a position of the choke valve based on manual inputs of speed, direction, and/or position by an operator, for example. In still further embodiments, the operator may manually input a speed, a direction, and/or a choke valve position through an external controller coupled to the VFD.

In some cases, the VFD may be configured (e.g., with a logic controller) to control a position of the choke valve based on feedback received from a pressure sensor indicative of a pressure of drilling fluid in the wellbore. When the pressure of the drilling fluid in the wellbore exceeds a first pressure threshold, the VFD may send electricity at a predetermined frequency to the actuator (e.g., the motor included in the actuator) to move the choke plug further from the opening of the choke valve, such that additional drilling fluid may flow through the choke valve and reduce the pressure in the wellbore. Similarly, when the pressure of the drilling fluid in the wellbore falls below a second pressure threshold (e.g., the second pressure is less than the first pressure threshold), the VFD may send electricity to the actuator (e.g., the motor included in the actuator) to move the choke plug toward the opening, thereby reducing a flow of the drilling fluid through the choke valve and increasing the pressure in the wellbore. Moreover, the VFD may continuously adjust a frequency of the electricity sent to the actuator (e.g., the motor included in the actuator) to move the position of the choke valve at a faster speed, a slower speed, or based on a desired speed profile (e.g., a speed curve) between an open and a closed position.

In other embodiments, feedback received from additional components and/or devices of the drilling rig may be indicative of wear on the choke valve (e.g., the choke plug and/or a tip of the choke plug). For example, the controller may utilize the feedback received from the additional components and/or devices of the drilling rig in combination with feedback received from the choke valve itself (e.g., feedback indicative of a position of the choke plug) to determine a condition of the choke valve. The condition feedback may include feedback relating to the health of the choke valve (e.g., wear, stress cracks, and/or leakage of the choke valve).

To help illustrate the manner in which the present embodiments may be used in a system, FIG. 1 illustrates an embodiment of a fluid-handling system 10. The fluid-handling system 10 may be part of a mineral extraction system or processing system (e.g., a hydrocarbon-production or processing system, such as a subsea or surface oil or gas well). In some embodiments, the fluid-handling system 10 may include a gas-uplift system, a water-injection system, a water/steam/chemicals injection system, or other system for conveying fluids. The fluid-handling system 10 includes a fluid source 12, a choke valve 14, and a fluid destination 16. The fluid source 12 may include a variety of fluid sources, such as an oil or natural gas well. The fluid source 12 may supply a variety of fluids, such as air, natural gas, oil, water (steam or liquid), other drilling fluids, or combinations thereof. The fluid arriving from the source 12 may be at relatively high pressures, e.g., pressures greater than 500 psi, 1000 psi, 5000 psi, 10,000 psi, 15,000 psi, 20,000 psi, 25,000 psi, or 30,000 psi. Additionally, the pressure of the fluid arriving from the source 12 may be higher than the pressure at the fluid destination 16.

The choke valve 14 includes an inlet 18, a choke body 20 (e.g., a production choke body, a drilling choke body, and/or a universal choke body), a choke trim 22 disposed within the choke body 20, an actuator 24, and a fluid outlet 26. The actuator 24 may modulate flow between the inlet 18 and the outlet 26 by adjusting the position of the choke trim 22 or a component of the choke trim 22 (e.g., a choke plug) relative to the choke body 20. The choke trim 22 (e.g., perforated annular sleeve) may adjust a cross-sectional area of a flow path of the fluid through the choke body, thereby adjusting the flow between the inlet 18 and the outlet 26. For example, the actuator 24 may be a manual actuator (e.g., a wheel), an electro-mechanical actuator (e.g., powered by an electric drive or motor 27), a hydraulic actuator (e.g., a fluid driven actuator), or other suitable type of actuator. To adjust the position of the choke trim 22 or a component of the choke trim 22 (e.g., a choke plug), the actuator 24 may exert a translational force on a shaft 28 coupled to the actuator 24 and the choke trim 22 or the component of the choke trim 22 (e.g., a stem and/or the choke plug 30).

Further, a variable frequency drive 31 (VFD) may be coupled to the actuator 24 through a wired connection to the motor 27 to control a speed at which the actuator 24 adjusts the position of the choke trim 22. For example, the VFD 31 may adjust a frequency of the motor 27 included in the actuator 24. The frequency of the motor 27 may dictate a rate of rotational output by the actuator 24, thereby controlling a speed at which the actuator 24 adjusts the position of the choke trim 22. The VFD 31 itself and utilizing the VFD 31 to adjust the position of the choke trim 22 is described in detail herein with reference to FIGS. 6-11.

Figure 3:
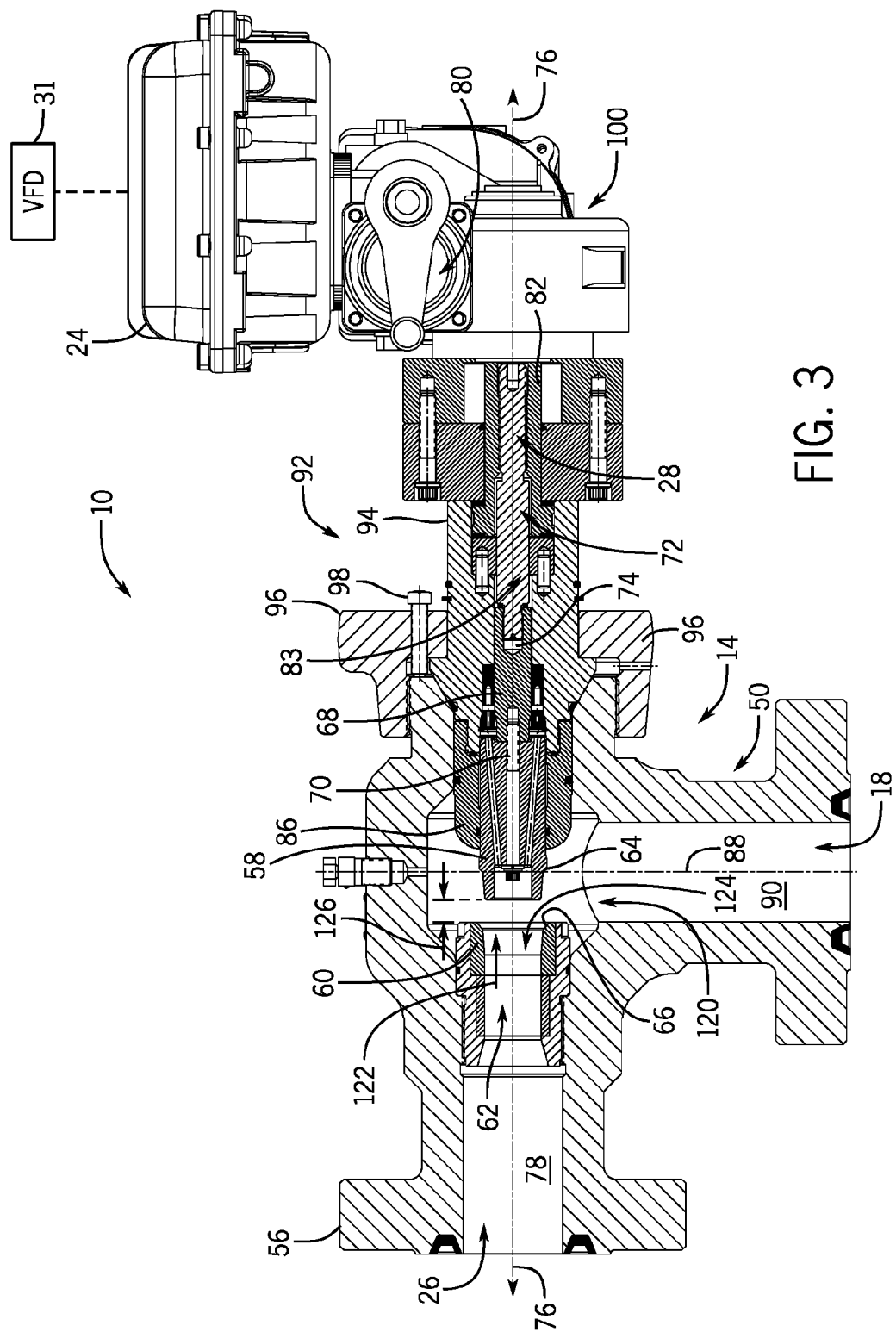
FIG. 3 is a section view of the choke valve of FIG. 2 in an open position, in accordance with an aspect of the present disclosure.
Figure 4:
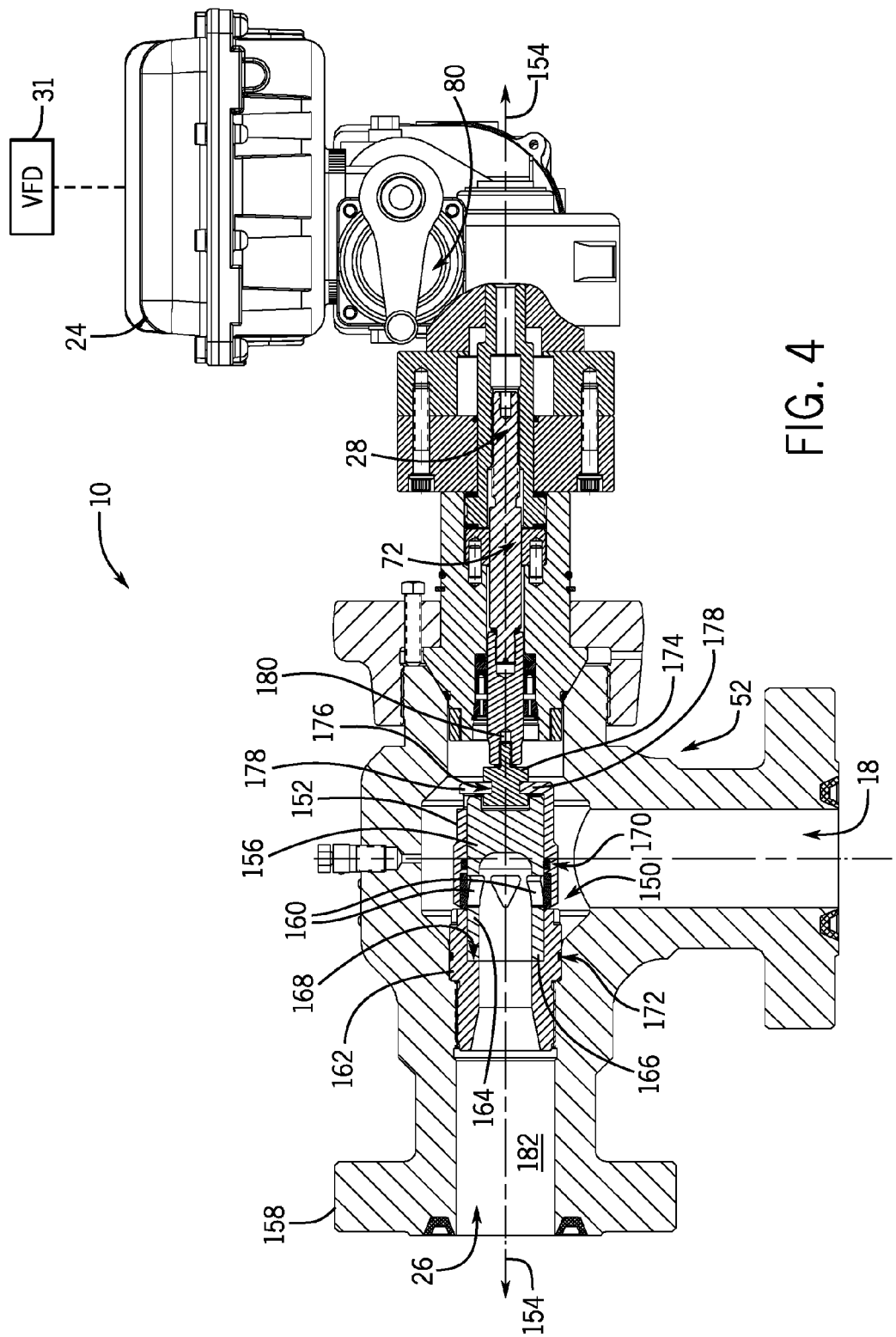
FIG. 4 is a section view of another embodiment of the choke valve of FIG. 1 in a closed position, in accordance with an aspect of the present disclosure.
Figure 5:
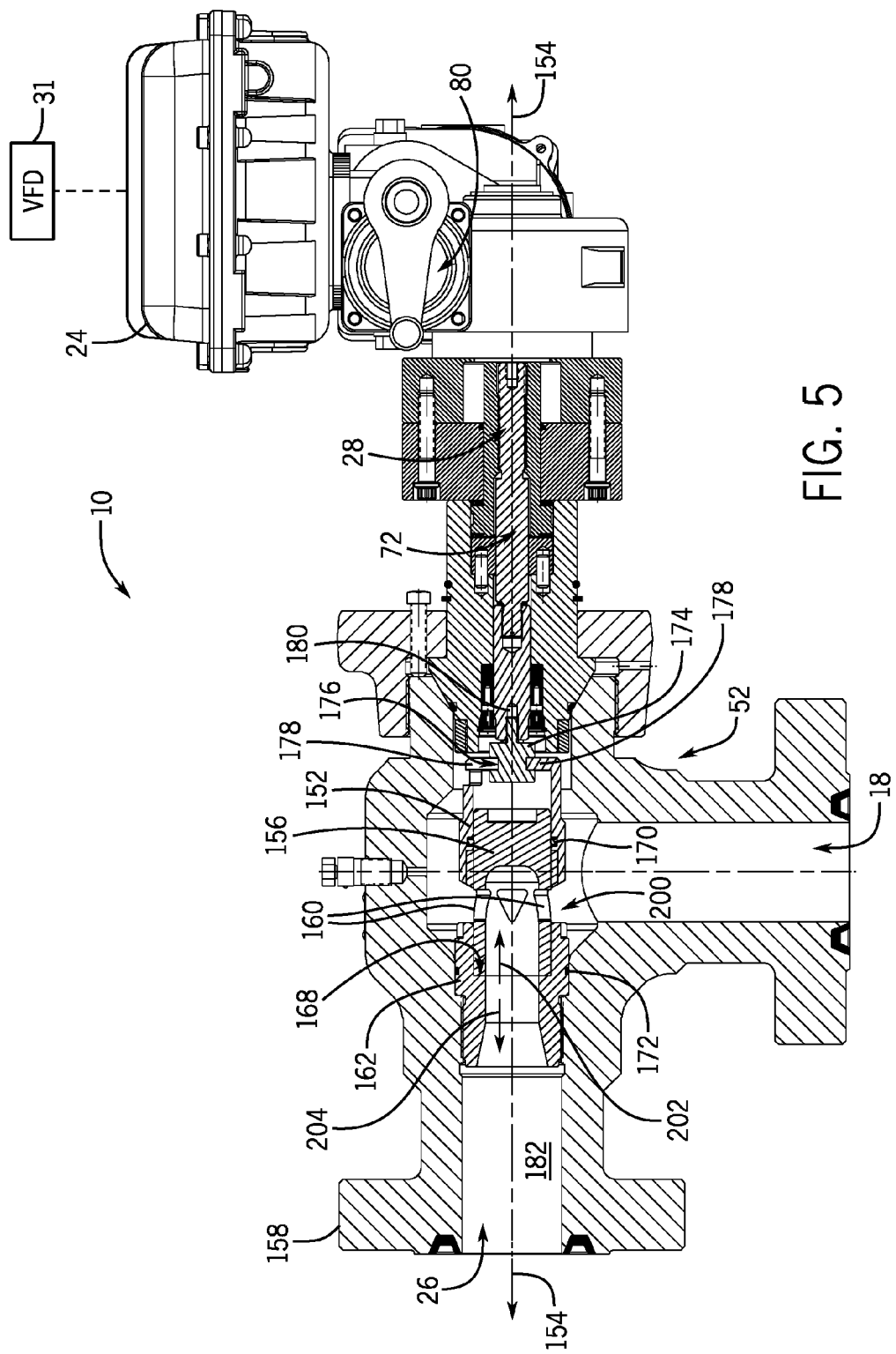
FIG. 5 is a section view of the choke valve of FIG. 4 in an open position, in accordance with an aspect of the present disclosure.

In accordance with embodiments of the present disclosure, the VFD 31 may be utilized with different types of choke valves 14. For example, FIGS. 2 and 3 illustrate the VFD 31 utilized in an embodiment of the fluid-handling system 10 that includes a gate and seat choke valve 50, whereas FIGS. 4 and 5 illustrate the VFD 31 utilized in an embodiment of the fluid-handling system 10 that includes a floating sleeve choke valve 52.

Figure 2:
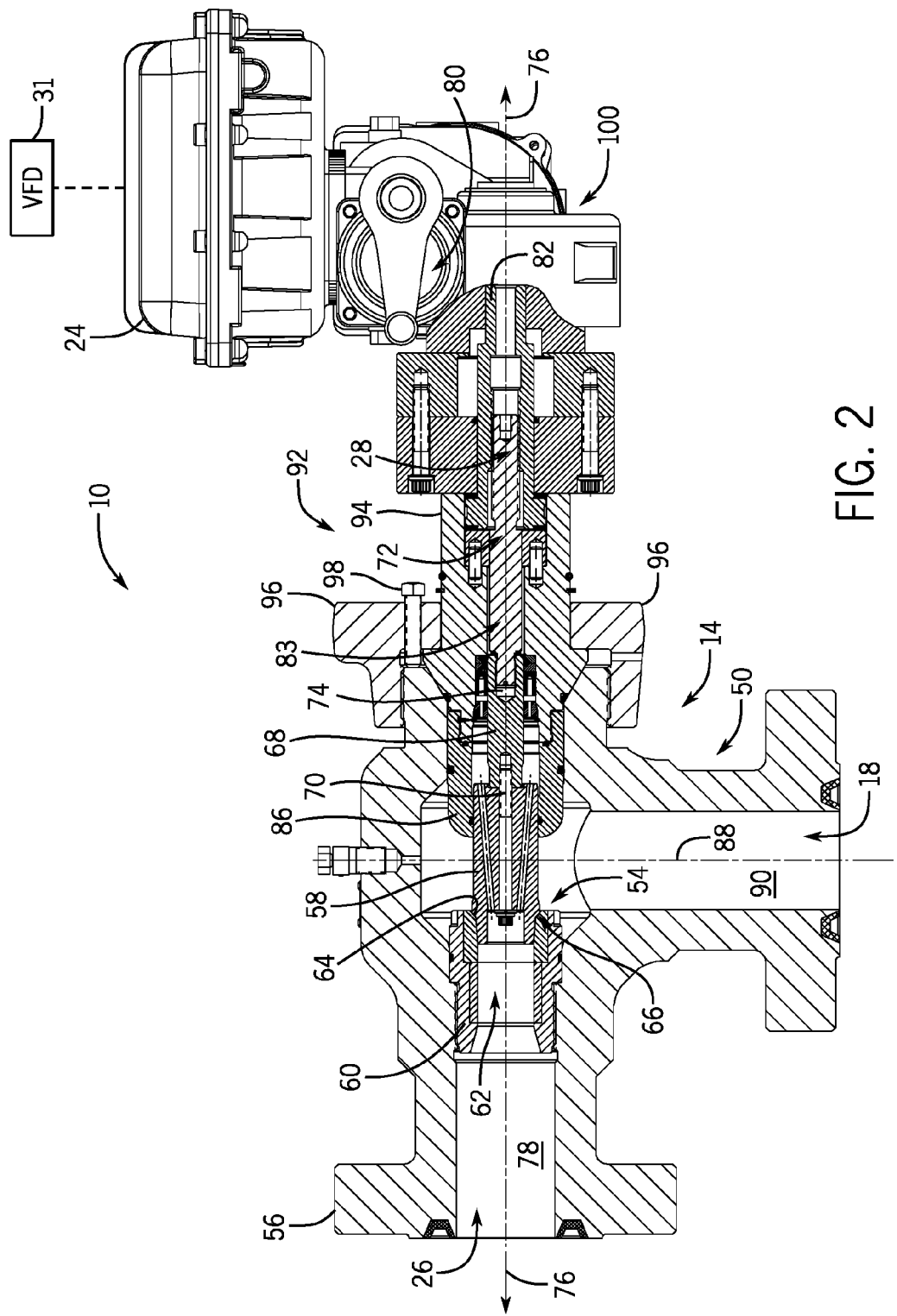
FIG. 2 is a section view of an embodiment of the choke valve of FIG. 1 in a closed position, in accordance with an aspect of the present disclosure.

FIG. 2 is a section view of an embodiment of the fluid-handling system 10 that includes the gate and seat choke valve 50 in a closed position 54. For example, the fluid-handling system 10 may include a body 56 in which the gate and seat choke valve 50 is disposed. The gate and seat choke valve 50 may be configured to block fluid from flowing from the inlet 18 and through the outlet 26 (e.g., through the body 56) by forming a seal between a gate 58 (e.g., annular gate and/or a rectangular gate) and a seat 60 (e.g., annular seat or a rectangular seat). For example, as shown in the illustrated embodiment of FIG. 2, the gate 58 is disposed within an annular opening 62 of the seat 60, such that a lip portion 64 of the gate 58 contacts a tapered surface 66 (e.g., a tapered annular surface) of the seat 60. Accordingly, a seal may be formed between the gate 58 and the seat 60 as a result of contact between the lip portion 64 and the tapered surface 66. Therefore, fluid may be blocked from flowing through the body 56 when the gate and seat choke valve 50 is in the closed position 54.

In some embodiments, the gate 58 may be coupled to an intermediate member 68 (e.g., a shaft or linkage) via a fastener 70 (e.g., a threaded fastener such as a bolt) extending through the gate 58 and into at least a portion of the intermediate member 68. Further, the intermediate member 68 may be coupled to a stem 72 via a second fastener 74 (e.g., a threaded fastener such as a bolt). The stem 72 may ultimately be coupled to the actuator 24, thereby enabling the gate 58 to be driven by the actuator 24 along a lateral outlet axis 76 extending through an annular outlet portion 78 of the body 56. In certain embodiments, the shaft 28 (e.g., a threaded shaft) may form a portion of the stem 72, such that the shaft 28 is configured to drive the gate 58 along the lateral outlet axis 76.

In the illustrated embodiment, the actuator 24 is an electric actuator that includes a wheel 80, a threaded bushing 82, and the threaded shaft 28 (e.g., an upper portion of the stem 72). Each of these components 80, 82, and 28 may be generally coaxial with the outlet axis 76 of the choke valve 14. The wheel 80 is configured to rotate about the outlet axis 76, thereby driving engagement of the threaded bushing 82 and axially pushing or pulling the shaft 28. As discussed above, the shaft 28 (e.g., the upper portion of the stem 72) may be coupled to the gate 58 (e.g., via the intermediate member 68) and move the gate 58 as the wheel 80 is rotated. Specifically, the intermediate member 68 is coupled to a lower portion 83 of the stem 72. Rotational motion of the wheel 80 is transferred to the lower stem 83 via the shaft 28. In certain embodiments, the lower stem 83 may convert the rotational motion of the shaft 28 into linear motion to enable linear movement of the gate 58 within the body 56.

In some embodiments, the gate 58 may be guided along the lateral outlet axis 76 by an annular nose 86 of the gate 58 and seat choke valve 50. For example, the gate 58 may be configured to extend through the annular nose 86, which may block crosswise movement of the gate 58 along an axis 88 crosswise to the outlet axis 76. In some embodiments, the axis 88 may extend through an annular inlet portion 90 of the body 56. In other words, the annular nose 86 may support the gate 58 as it moves laterally along the outlet axis 76. Additionally, the annular nose 86 may remain substantially stationary with respect to the body 56 when the nose 86 is disposed within the body 56.

In certain embodiments, the actuator 24 may be coupled to the body 56 via a bonnet assembly 92. In certain embodiments, the bonnet assembly 92 may include an annular bonnet 94 configured to receive the stem 72 and/or the shaft 28. The annular bonnet 94 may be coupled to the body 56 using a bonnet nut 96 secured to the body 56 with a fastener 98 (e.g., a threaded fastener such as a bolt). Accordingly, the actuator 24 may remain substantially stationary with respect to the body 56 despite movement of the components 80, 82, and/or 28 disposed at least partially within a housing 100 of the actuator 24.

As discussed above, the actuator 24 may include the motor 27, which may be coupled to the VFD 31 through a wired connection. The VFD 31 may control a speed of the motor 27, which thereby adjusts a speed at which the gate 58 moves along the outlet axis 76. For example, FIG. 3 is a section view of the fluid-handling system 10 that includes the gate and seat choke valve 50 in an open position 120 (e.g., the gate 58 has moved in an axial direction 122 along the outlet axis 76). As shown in the illustrated embodiment of FIG. 3, movement of the gate 58 in the direction 122 disengages the gate 58 (e.g., the lip portion 64) from the seat 60 (e.g., the tapered surface 66), such that the seal between the gate 58 and the seat 60 is opened to create a gap or opening 124 between the gate 58 and the seat 60 (e.g., to enable fluid to flow through the body 56).

In some embodiments, the greater a distance 126 between the gate 58 and the seat 60 the more fluid that may flow through the body 56, and the more pressure that may be released from a wellbore, for example. Conversely, decreasing the distance 126 between the gate 58 and the seat 60 may decrease a flow rate of the fluid through the body 56, thereby reducing an amount of pressure that may be released from the wellbore. Accordingly, decreasing the distance 126 between the gate 58 and the seat 60 may increase a pressure within the wellbore. The VFD 31 may thus be utilized to increase and/or decrease the distance 126 between the gate 58 and the seat 60 at various speeds. Accordingly, the flow rate of fluid through the body 56 may be precisely controlled as a result of the ability to axially move the gate 58 at a given speed based on feedback received from other components of the overall system, for example.

As discussed above, the VFD 31 may be included in embodiments of the fluid-handling system 10 that include different types of choke valves. For example, FIG. 4 is a section view of an embodiment of the fluid-handling system 10 that includes the floating sleeve choke valve 52 in a closed position 150. In some cases, using the floating sleeve choke valve 52 may allow for more precise pressure and flow control within the fluid-handling system 10, because of a floating configuration of a floating external sleeve 152 of the floating sleeve choke valve 52.

In the illustrated embodiment of FIG. 4, the floating sleeve choke valve 52 includes the floating external sleeve 152 configured to translate axially along a lateral outlet axis 154 of the floating sleeve choke valve 52. In some embodiments, the floating external sleeve 152 may be configured to be disposed over an inner cage 156 of the floating sleeve choke valve 52. The inner cage 156 may remain substantially stationary with respect to a body 158 of the fluid-handling system 10. Additionally, the inner cage 156 (e.g., a perforated annular cage) may include one or more openings 160 that enable fluid (e.g., drilling fluid) to flow from the inlet 18 to the outlet 26 (e.g., through the body 158). However, as shown in the illustrated embodiment of FIG. 4, the floating external sleeve 152 is disposed over the openings 160, such that a flow of the fluid through the body 158 is blocked (e.g., the floating sleeve choke valve 52 is in the closed position 150).

The floating sleeve choke valve 52 further includes an annular seat assembly 162 configured to receive at least a portion 164 of the inner cage 156. As shown in the illustrated embodiment of FIG. 4, the annular seat assembly 162 may include a recess 166 configured to contact a surface 168 of the inner cage 156, thereby blocking movement of the inner cage 156 along the outlet axis 154. Additionally, the floating sleeve choke valve 52 may include other features, such as seals 170 (e.g., annular seals or T-seals) disposed between the inner cage 156 and the external sleeve 152. Similarly, the floating sleeve choke valve 52 may include seals 172 (e.g., annular seals or O-rings) disposed between the seat assembly 162 and the inner cage 156.

As shown in the illustrated embodiment of FIG. 4, the floating external sleeve 152 may be coupled to a stem adapter 174. For example, the stem adapter 174 may include a recess 176 configured to receive clamping members 178 of the floating external sleeve 152, thereby coupling the floating external sleeve 152 to the stem adapter 174. Further, the stem adapter 174 may be coupled to the stem 72 via a fastener 180 (e.g., a threaded fastener such as a bolt) extending from the stem adapter 174 into the stem 72. As discussed above with reference to the gate and seat choke valve 50, the stem 72 may ultimately be coupled to the actuator 24, which enables the external floating sleeve 152 to be driven by the actuator 24 along the lateral outlet axis 154 extending through an annular outlet portion 182 of the body 158. In certain embodiments, the actuator 24 may be configured to move the external floating sleeve 152 along the outlet axis 154 via the shaft 28 (e.g., a threaded shaft and/or an upper portion of the stem 72). As discussed above, the wheel 80 of the actuator 24 may rotate, thereby driving the shaft 28 to move along the outlet axis 154 and driving the floating external sleeve 152 to move toward and/or away from the openings 160 of the inner cage 156.

As discussed above, the actuator 24 may include the motor 27, which may be coupled to the VFD 31 through a wired connection. The VFD 31 may be configured to control a speed of the motor 27, which thereby adjusts a speed at which the floating external sleeve 152 translates along the outlet axis 154. For example, FIG. 5 is a section view of the fluid-handling system 10 that includes the floating sleeve choke valve 52 in an open position 200 (e.g., the floating external sleeve has moved in an axial direction 202 along the outlet axis 154 away from the openings 160). As shown in the illustrated embodiment of FIG. 5, movement of the floating external sleeve 152 in the direction 202 uncovers the openings 160, thereby enabling fluid (e.g., drilling fluid) to flow from the inlet 18, through the openings 160, and to the outlet 26 at a maximum flow rate (e.g., the openings 160 are completely uncovered).

In some embodiments, the floating external sleeve 152 may be configured to partially cover the openings 160 to control a flow rate of fluid through the body 158. For example, as the openings 160 become larger (e.g., the floating external sleeve 152 moves in the axial direction 202), more fluid (e.g., drilling fluid) may flow through the body 158 and more pressure may be released from a wellbore, for example. Conversely, decreasing the size of the openings 160 (e.g., moving the floating external sleeve 152 in a second axial direction 204 opposite the axial direction 202) may decrease a flow rate of the fluid through the body 158, thereby reducing an amount of pressure that may be released from the wellbore.

Figure 6:
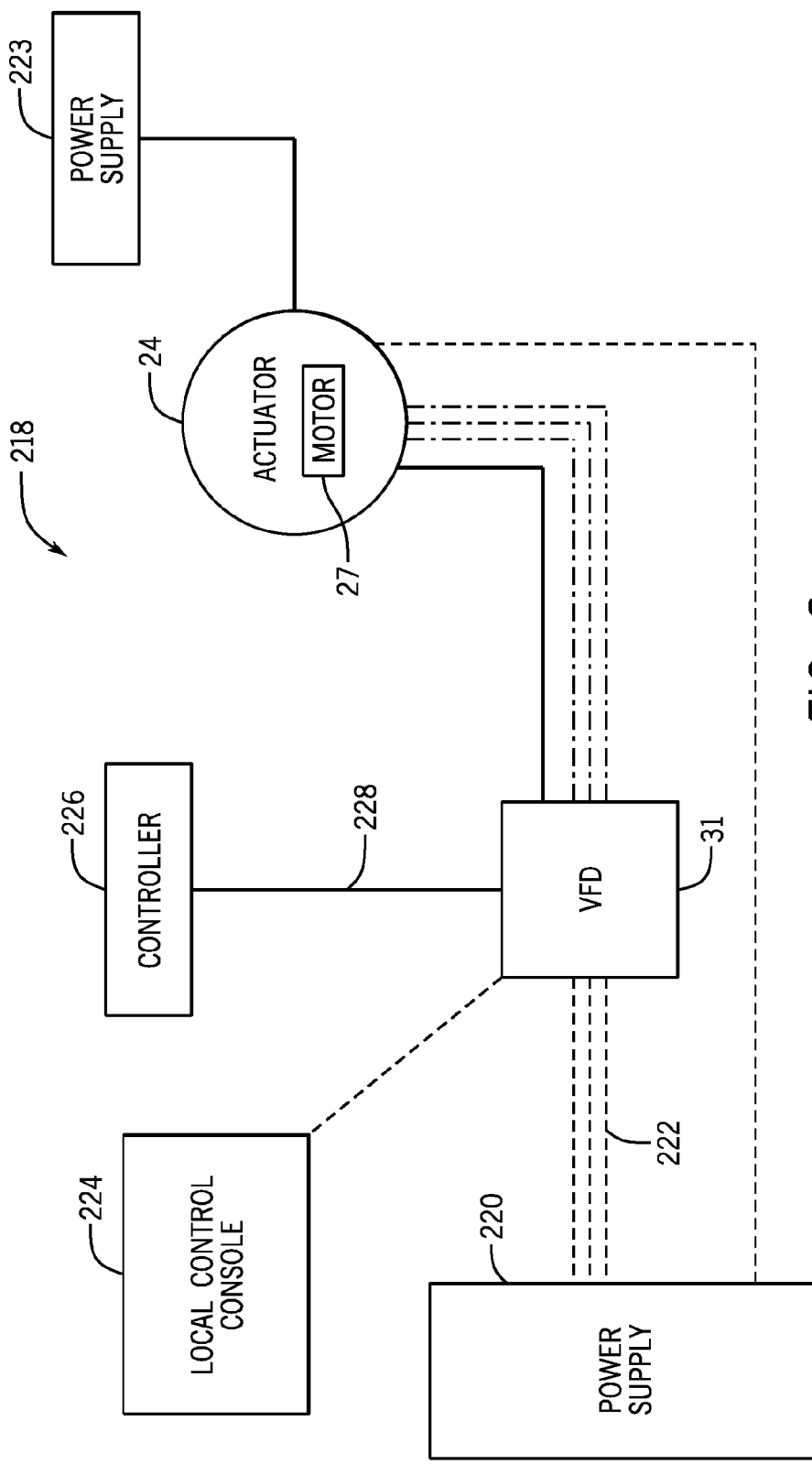
FIG. 6 is a schematic of an embodiment of a wiring diagram for coupling the VFD to a controller and an actuator, in accordance with an aspect of the present disclosure.

As discussed above, the VFD 31 may be utilized to control a rate at which the actuator 24 (e.g., the shaft 28) moves, thereby enabling precise control over a flow rate of fluid through the body 20 of the fluid-handling system 10. For example, FIG. 6 is a schematic of an embodiment of a wiring diagram 218, illustrating the VFD 31 coupled to components of the fluid-handling system 10. As shown in the illustrated embodiment of FIG. 6, the VFD 31 may be coupled to the actuator 24 through a wired connection (e.g., the motor 27 included in the actuator 24). It should be recognized that the VFD 31 may be located proximate to the actuator 24 or remote from the actuator 24. It may be desirable to locate the VFD 31 remote from the actuator 24 when the fluid-handling system 10 is disposed in a relatively harsh environment (e.g., a wellbore), thereby protecting the VFD 31 and/or reducing an amount of maintenance that may be performed on the VFD 31.

Additionally, the VFD 31 may be coupled to a power supply 220 configured to provide electrical energy to the VFD 31. The VFD 31 may be coupled to the power supply 220 via a power cable 222. In some embodiments, the power supply 220 may be utilized to supply electrical energy to other components of an overall system (e.g., a mineral extraction system) that includes the fluid-handling system 10. For example, the actuator 24 may be coupled to the power supply 220. In other embodiments, however, the actuator 24 may receive power from an additional power supply 223, separate from the power supply 220.

Additionally, in some embodiments, the VFD 31 may be coupled to a local control console 224. The local control console 224 may enable the VFD 31 to adjust a speed at which the actuator 24 is opened and/or closed based on specific feedback received by the local control console 224. For example, the local control console 224 may be coupled to one or more components and/or sensors that provide feedback that may be utilized to control a flow rate of the fluid through the body 20 of the fluid-handling system 10. In other embodiments, the VFD 31 may be coupled to a controller 226 of the overall system (e.g., a mineral extraction system) via a communications bus 228 or other electronic coupling device. The controller 226 may receive feedback from each component of the overall system (e.g., the mineral extraction system), such that the VFD 31 may be configured to adjust the speed at which the actuator 24 opens and/or closes based on feedback received from any component of the overall system. For example, the VFD 31 may be configured to adjust a speed at which the actuator opens and/or closes based on a fluid pressure at the inlet 18 (or the outlet 26), based on a position of the choke valve 14, and/or any based on any suitable feedback received by the controller 226 indicative of a condition of the fluid upstream and/or downstream of the choke valve 14.

In some embodiments, the VFD 31 may include an individual control device to control the VFD 31 and thus the fluid-handling system 10. In some embodiments, the VFD 31 may be controlled by an external controller (e.g., the overall controller 226). In still further embodiments, the VFD 31 may be controlled by both the individual control device and the external controller. In any case, the VFD 31 may be configured to adjust a speed at which the actuator 24 opens and/or closes the choke valve 14. In some embodiments, the VFD 31 may be configured to open and/or close the choke valve 14 in accordance with one or more control modes. For example, FIG. 7 is a schematic of a control device 250 (e.g., the controller 226 and/or a separate control device of the VFD 31).

Figure 7:
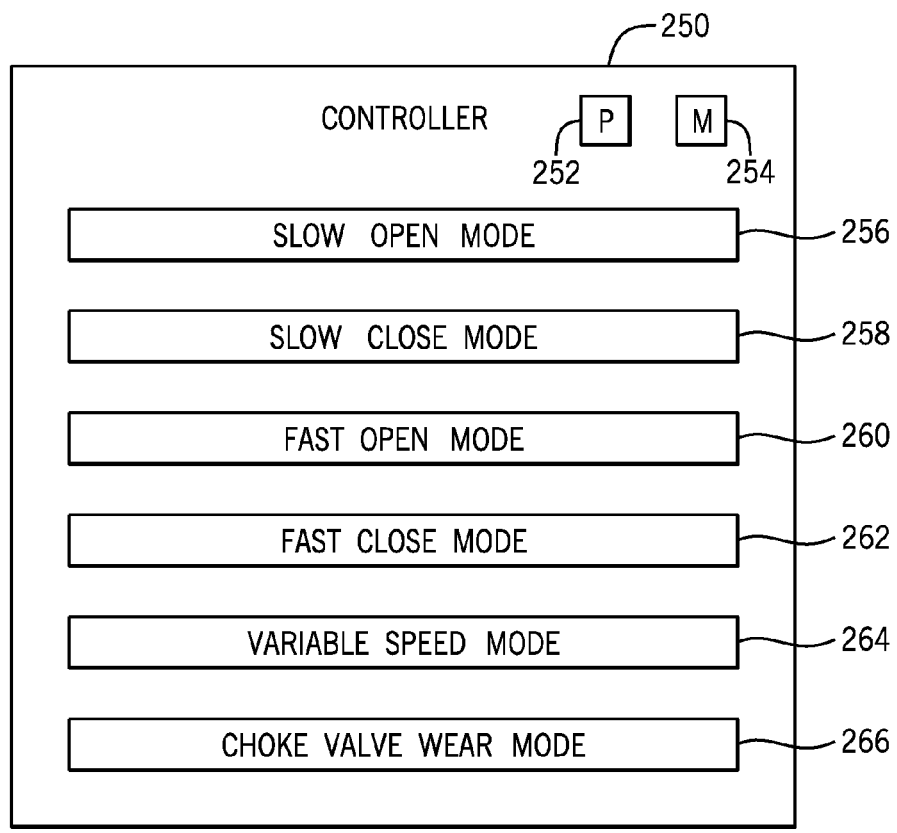
FIG. 7 is a schematic of an embodiment of a controller that may be utilized to adjust a position of the choke valve of FIG. 1 using the VFD, in accordance with an aspect of the present disclosure.

As shown in the illustrated embodiment of FIG. 7, the control device 250 may include a processor 252 and a memory component 254. In some cases, the processor 252 may be configured to execute instructions stored on the memory component 254. For example, the processor 252 may be configured to execute instructions corresponding to one or more control modes based on feedback received from one or more components of the overall system (e.g., mineral extraction system). As shown in the illustrated embodiment of FIG. 7, the processor 252 may be configured to execute a slow open control mode 256, a slow close control mode 258, a fast open control mode 260, a fast close control mode 262, a variable speed control mode 264, and/or a choke valve wear control mode 266. Accordingly, the control device 250 may execute one or more of the control modes 256, 258, 260, 262, 264, and/or 266 to achieve a desired result (e.g., a predetermined pressure of the fluid upstream of the choke valve 14).

For example, the control device 250 may execute the slow open control mode 256 and/or the slow open control mode 258 when a speed at which the position of the choke valve 14 is adjusted may gradually increase and/or decrease. Accordingly, the control device 250 may open and/or close the choke valve 14 in accordance with a speed profile that includes gradual speed changes. Gradual speed changes may be desirable when operating conditions of the system are relatively stable, such that slow changes in the position of the choke valve 14 may enable the fluid-handling system 10 to achieve desired results.

Additionally, the control device 250 may execute the fast open control mod 260 and/or the fast close control mode 262 when a speed at which the position of the choke valve 14 is adjusted may rapidly change. Accordingly, the control device 250 may open and/or close the valve 14 in accordance with a speed profile that includes rapid speed changes. The rapid speed changes may be desirable when operating conditions of the system change unexpectedly, thereby justifying quick changes in the position of the choke valve 14.

The control device 250 may also be configured to vary the speed at which the position of the choke valve 14 is adjusted in real time (e.g., the variable speed control mode 264). Accordingly, the speed at which the position of the choke valve 14 may constantly change based on feedback indicative of operating parameters of the system (e.g., the speed at which the position of the choke valve 14 is adjusted is not determined from a predetermined speed profile, but based on feedback).

Finally, the control device 250 may determine a condition of the choke valve 14 based at least on feedback received from the choke valve 14 and feedback indicative of other operating parameters of the system. In some embodiments, when the control device 250 determines that the choke valve 14 has incurred wear, the control device 250 may update one or more of the control modes, such that speeds and/or speed profiles reflect the current condition of the choke valve 14.

Figure 8:
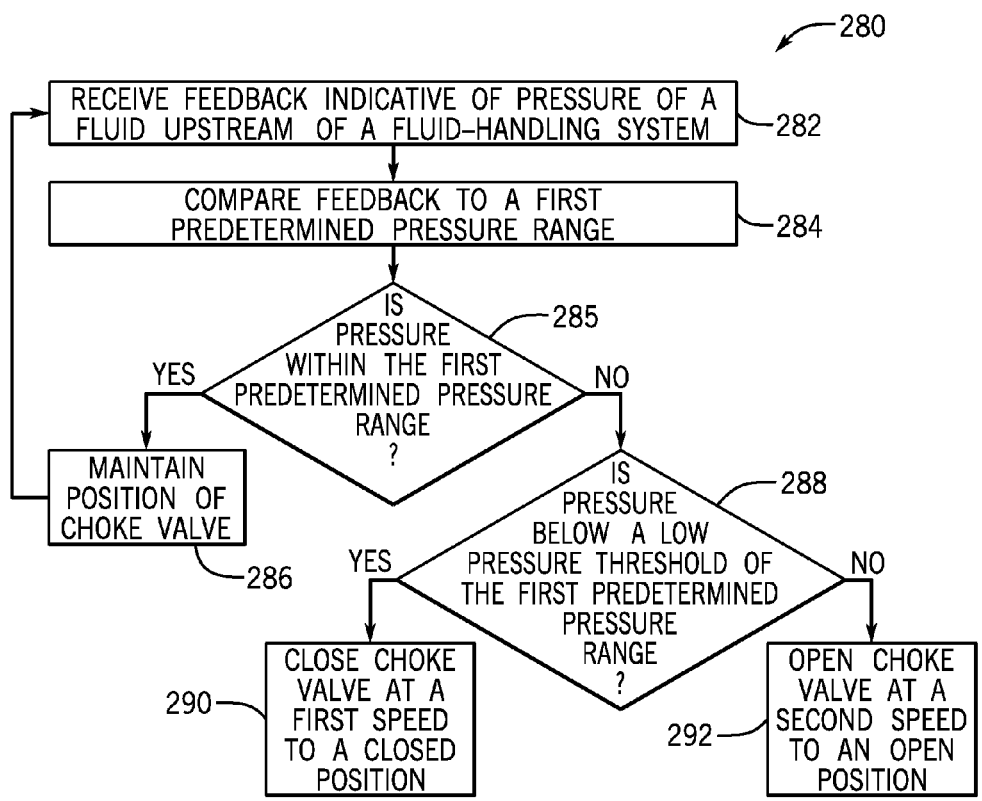
FIG. 8 is a flow diagram of an embodiment of a process that the controller may execute to adjust the position of the choke valve of FIG. 1 using the VFD, in accordance with an aspect of the present disclosure.

In some cases, it may be desirable to open and/or close the choke valve 14 to adjust a pressure of a fluid upstream of the fluid-handling system 10. For example, FIG. 8 is a flow chart of an embodiment of a process 280 configured to open and/or close the choke valve 14 at a relatively slow speed (e.g., the slow open control mode 256 and the slow close control mode 258). At block 282, the control device 250 may receive feedback indicative of a pressure of the fluid upstream of the fluid-handling system 10 (e.g., from a pressure transducer or other pressure monitoring device). Accordingly, at block 284, the control device 250 may compare the feedback indicative of the pressure of the fluid upstream of the fluid-handling system 10 (e.g., drilling fluid in a wellbore) to a first predetermined pressure range. For example, during managed pressure drilling (MPD) operations, it may be desirable to maintain a pressure of drilling fluid in a wellbore within a predetermined range. At block 285, the control device 250 may determine whether the feedback indicative of the pressure of the fluid upstream of the fluid-handling system 10 is within the first predetermined pressure range. When the pressure of the fluid upstream of the fluid-handling system 10 is within the first predetermined pressure range, the control device 250 may take no action, such that a position of the actuator 24 is maintained, as shown at block 286.

However, when a pressure of the fluid is outside of the first predetermined pressure range, the control device 250 may send one or more signals to adjust a position of the actuator 24 (e.g., to a closed position, a fully open position, or a partially open position based at least on a difference between the pressure of the fluid and the predetermined pressure range). For example, at block 288, the control device 250 may be configured to determine whether the pressure of the fluid upstream of the fluid-handling system 10 is below a low pressure threshold of the first predetermined pressure range. In other embodiments, the control device 250 may be configured to determine whether the pressure of the fluid upstream of the fluid-handling system 10 is above a high pressure threshold of the first predetermined pressure range. In still further embodiments, the control device 250 may be configured to determine whether pressure of the fluid upstream of the fluid-handling system 10 is either above the high pressure threshold of the first predetermined pressure range and/or below the low pressure threshold of the first predetermined pressure range.

At block 290, when the control device 250 determines that the pressure of the fluid upstream of the fluid-handling system 10 is below the low pressure threshold of the first predetermined pressure range, the control device 250 may send one or more signals to the VFD 31 and/or the actuator 24 to close the choke valve 14 (e.g., adjusting the choke valve 14 to a closed position may increase the pressure of the fluid upstream of the fluid-handling system 10). For example, the control device 250 may send a signal to the VFD 31 to adjust a position of the choke trim 22 toward the closed position at a first speed. Accordingly, the VFD 31 may send electricity at a first frequency to the motor 27 included in the actuator 24 to operate at a predetermined speed, such that the actuator 24 moves the choke trim 22 at the first speed toward the closed position.

In some embodiments, the first frequency sent by the VFD 31 may be proportional to the speed of the motor 27. Additionally, the first speed (e.g., a speed profile and/or a speed curve) may be based at least on a difference between the low pressure threshold and the pressure of the fluid upstream of the fluid-handling system 10 (e.g., determined from the feedback received by the control device 250). In some embodiments, the first speed (e.g., a speed profile and/or a speed curve) may increase as the difference between the low pressure threshold and the pressure of the fluid upstream of the fluid-handling system 10 increases (e.g., the choke valve 14 is configured to close faster as the pressure of the fluid upstream of the fluid-handling system 10 grows further from the first predetermined pressure range). Similarly, the first speed (e.g., a speed profile and/or a speed curve) may decrease as the difference between the low pressure threshold and the pressure of the fluid upstream of the fluid-handling system decreases (e.g., the choke valve 14 is configured to close slower as the pressure of the fluid upstream of the fluid-handling system 10 approaches the first predetermined pressure range).

Similarly, at block 292, when the control device 250 determines that the pressure of the fluid upstream of the fluid-handling system 10 is not below the low pressure threshold of the first predetermined pressure range, the control device 250 may conclude that the pressure of the fluid upstream of the fluid-handling system 10 is above a high pressure threshold of the first predetermined pressure range. Accordingly, the control device 250 may send one or more signals to the VFD 31 and/or the actuator 24 to open the choke valve 14 (e.g., opening the choke valve 14 may reduce the pressure of the fluid upstream of the fluid-handling system 10). For example, the control device 250 may send a signal to the VFD 31 to open the choke valve 14 at a second speed (e.g., a speed profile and/or a speed curve). Accordingly, the VFD 31 may send electricity at a second frequency to the motor 27 included in the actuator 24 to operate at a predetermined speed, such that the actuator 24 opens the choke valve 14 at the second speed (e.g., a speed profile and/or a speed curve).

The second speed (e.g., a speed profile and/or a speed curve) may be based at least on a difference between the pressure of the fluid upstream of the fluid-handling system 10 (e.g., determined from the feedback received by the control device 250) and the high pressure threshold of the first predetermined pressure range. In some embodiments, the second speed (e.g., a speed profile and/or a speed curve) may increase as the difference between the pressure of the fluid upstream of the fluid-handling system 10 and the high pressure threshold increases (e.g., the choke valve 14 is configured to open faster as the pressure of the fluid upstream of the fluid-handling system 10 grows further from the first predetermined pressure range). Similarly, the second speed (e.g., a speed profile and/or a speed curve) may decrease as the difference between the pressure of the fluid upstream of the fluid-handling system and the high pressure threshold decreases (e.g., the choke valve 14 is configured to open slower as the pressure of the fluid upstream of the fluid-handling system 10 approaches the first predetermined pressure range).

In certain embodiments, the control device 250 may open the choke valve 14 to a first position based on the difference between the pressure of the fluid upstream of the fluid-handling system 10 and the high pressure threshold of the first predetermined pressure range. As the difference increases, the control device 250 may be configured to adjust the choke trim 22 toward a fully open position. When the choke valve 14 reaches the fully open position and the difference between the pressure of the fluid and the high pressure threshold is still relatively large, the control device 250 may send one or more signals to additional components that may enable pressure regulation of the fluid upstream of the fluid-handling system 10 (e.g., a blow out preventer).

Figure 9:
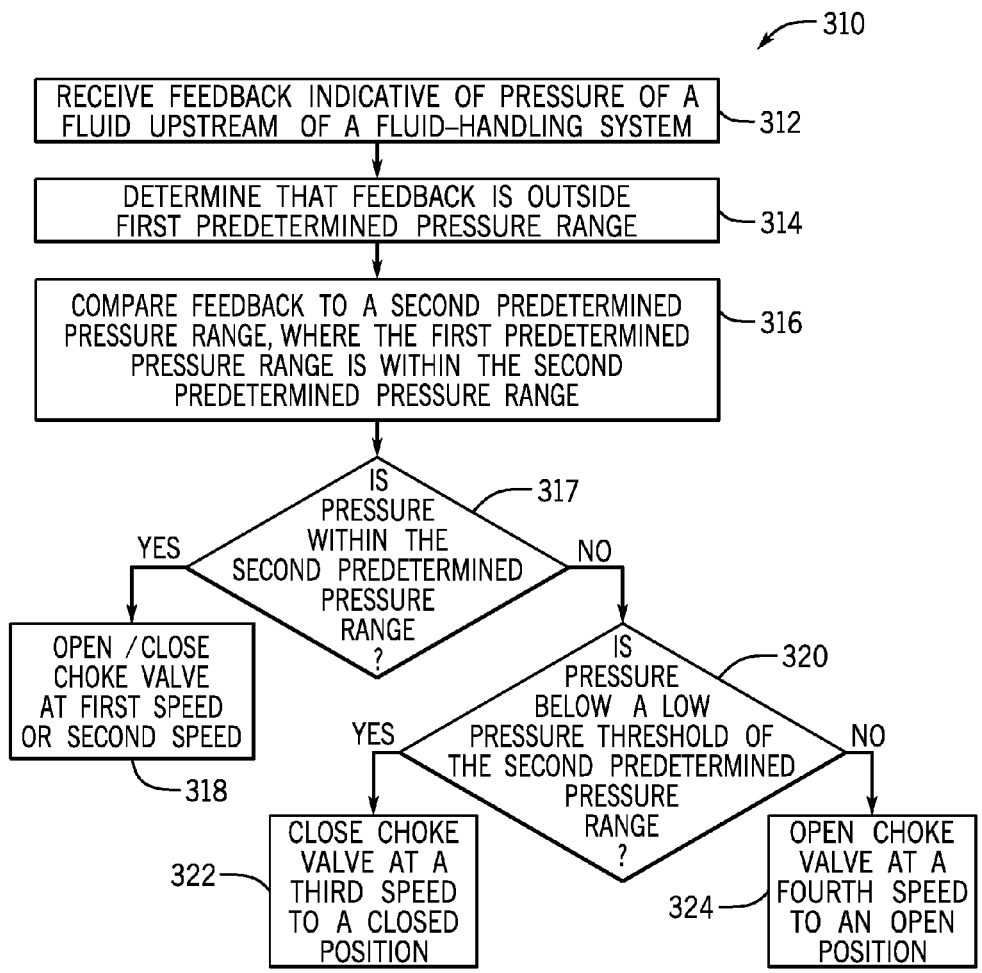
FIG. 9 is a flow diagram of an embodiment of a process that the controller may execute to adjust the position of the choke valve of FIG. 1 using the VFD, in accordance with an aspect of the present disclosure.

In some cases, it may be desirable to increase a speed at which the choke valve 14 is opened and/or closed by the actuator 24. For example, when the pressure of the fluid upstream of the fluid-handling system 10 is outside of a second predetermined pressure range (e.g., the second predetermined pressure range includes the first predetermined pressure range), it may be desirable to quickly adjust the position of the choke valve 14 to an open position and/or the closed position. FIG. 9 is a flow chart of an embodiment of a process 310 configured to open and/or close the choke valve 14 at a relatively fast speed (e.g., twice as fast, three times as fast, four times as fast, or more times as fast as the slow speed).

At block 312, the control device 250 may receive feedback indicative of a pressure of the fluid upstream of the fluid-handling system 10 (e.g., from a pressure transducer or other pressure monitoring device). At block 314, the control device 250 may be configured to determine that the feedback indicative of the pressure of the fluid upstream of the fluid-handling system 10 (e.g., drilling fluid in a wellbore) is outside of the first predetermined pressure range. Additionally, at block 316, the control device 250 may then compare the pressure of the fluid upstream of the fluid-handling system 10 to a second predetermined pressure range, where, in some cases, the second predetermined pressure range includes the first predetermined pressure range. At block 317, the control device 250 may determine whether the feedback indicative of the pressure upstream of the fluid-handling system 10 is inside of the second predetermined pressure range. At block 318, when the pressure of the fluid upstream of the fluid-handling system 10 is within the second predetermined pressure range, but outside of the first predetermined pressure range, the control device 250 may execute the process 280, as discussed above with respect to FIG. 8.

However, when the pressure of the fluid is outside of the second predetermined pressure range, the control device 250 may send one or more signals to adjust a position of the actuator 24 at an increased speed (e.g., a speed profile and/or a speed curve) compared to when the pressure is outside of the first predetermined pressure range. For example, at block 320, the control device 250 may be configured to determine whether the pressure of the fluid upstream of the fluid-handling system 10 is below a low pressure threshold of the second predetermined pressure range. In other embodiments, the control device 250 may be configured to determine whether the pressure of the fluid upstream of the fluid-handling system 10 is above a high pressure threshold of the second predetermined pressure range. In still further embodiments, the control device 250 may be configured to determine whether the pressure of the fluid upstream of the fluid-handling system 10 is either above the high pressure threshold of the second predetermined pressure range and/or below the low pressure threshold of the second predetermined pressure range.

At block 322, when the control device 250 determines that the pressure of the fluid upstream of the fluid-handling system 10 is below the low pressure threshold of the second predetermined pressure range, the control device 250 may send one or more signals to the VFD 31 and/or the actuator 24 to adjust the choke valve 14 to the closed position at a relatively high speed (e.g., closing the choke valve 14 may increase the pressure of the fluid upstream of the fluid-handling system 10). For example, the control device 250 may send a signal to the VFD 31 to close the choke valve 14 at a third speed (e.g., a speed profile and/or a speed curve), greater than the first speed (e.g., a speed profile and/or a speed curve). Accordingly, the VFD 31 may send electricity at a third frequency to the motor 27 included in the actuator 24 to operate at a predetermined speed, such that the actuator 24 closes the choke valve 14 at the third speed (e.g., the third frequency may be at a higher frequency than the first frequency, thereby increasing the speed at which the choke valve 14 closes).

In some embodiments, electricity at the third frequency sent by the VFD 31 may be proportional to the speed of the motor 27. Additionally, the third speed (e.g., a speed profile and/or a speed curve) may be based at least on a difference between the low pressure threshold of the second predetermined pressure range and the pressure of the fluid upstream of the fluid-handling system 10 (e.g., determined from the feedback received by the control device 250). In some embodiments, the third speed (e.g., a speed profile and/or a speed curve) may increase as the difference between the low pressure threshold and the pressure of the fluid upstream of the fluid-handling system 10 increases (e.g., the choke valve 14 is configured to close more quickly as the pressure of the fluid upstream of the fluid-handling system 10 grows further from the first predetermined pressure range).

Moreover, calculation of the third speed (e.g., a speed profile and/or a speed curve) may include a first factor greater than a second factor utilized to calculate the first speed (e.g., a speed profile and/or a speed curve). For example, when the pressure of the fluid upstream of the fluid-handling system 10 is outside of the second predetermined pressure range, the third speed (e.g., a speed profile and/or a speed curve) may be calculated by multiplying the difference between the low pressure threshold of the second predetermined pressure range and the pressure of the fluid upstream of the fluid-handling system 10 by the first factor (e.g., two, three, four, five, or more), whereas the first speed (e.g., a speed profile and/or a speed curve) may be calculated by multiplying the difference between the low pressure threshold of the first predetermined pressure range and the pressure of the fluid upstream of the fluid-handling system by the second factor (e.g., 0.5, 1, or 1.5).

At block 324, when the control device 250 determines that the pressure of the fluid upstream of the fluid-handling system 10 is not below the low pressure threshold of the second predetermined pressure range, the control device 250 may conclude that the pressure of the fluid upstream of the fluid-handling system 10 is above a high pressure threshold of the second predetermined pressure range. Accordingly, the control device 250 may send one or more signals to the VFD 31 and/or the actuator 24 to adjust a position the choke valve 14 to an open position (e.g., opening the choke valve 14 to a fully open position or a partially open position to reduce the pressure of the fluid upstream of the fluid-handling system 10). For example, the control device 250 may send a signal to the VFD 31 to open the choke valve 14 at a fourth speed (e.g., a speed profile and/or a speed curve). Accordingly, the VFD 31 may send electricity at a fourth frequency to the motor 27 included in the actuator 24 to operate at a predetermined speed, such that the actuator 24 opens the choke valve 14 at the fourth speed (e.g., the fourth frequency may be at a higher frequency than the second frequency, thereby increasing the speed at which the choke valve 14 opens).

The fourth speed (e.g., a speed profile and/or a speed curve) may be based at least on a difference between the pressure of the fluid upstream of the fluid-handling system 10 (e.g., determined from the feedback received by the control device 250) and the high pressure threshold of the second predetermined pressure range. In some embodiments, the fourth speed (e.g., a speed profile and/or a speed curve) may increase as the difference between the pressure of the fluid upstream of the fluid-handling system 10 and the high pressure threshold increases (e.g., the choke valve 14 is configured to open more quickly as the pressure of the fluid upstream of the fluid-handling system 10 grows further from the second predetermined pressure range).

Moreover, calculation of the fourth speed may include a third factor greater than a fourth factor used to calculate the second speed. For example, when the pressure of the fluid upstream of the fluid-handling system 10 is outside of the second predetermined pressure range, the fourth speed (e.g., a speed profile and/or a speed curve) may be calculated by multiplying the difference between the pressure of the fluid upstream of the fluid-handling system 10 and the high pressure threshold of the second predetermined pressure range by third factor (e.g., two, three, four, five, or more), whereas the second speed (e.g., a speed profile and/or a speed curve) may be calculated by multiplying the difference between the pressure of the fluid upstream of the fluid-handling system and the high pressure threshold of the first predetermined pressure range by the fourth factor (e.g., 0.5, 1, or 1.5).

In some embodiments, the control device 250 may determine a position of the choke valve 14 based on the difference between the pressure of the fluid upstream of the fluid-handling system 10 and the high pressure threshold of the second predetermined pressure range. As the difference increases, the control device 250 may be configured to adjust the choke trim 22 toward a fully open position. When the choke valve 14 reaches the fully open position and the difference between the pressure of the fluid and the high pressure threshold is still relatively large, the control device 250 may send one or more signals to additional components that may enable pressure regulation of the fluid upstream of the fluid-handling system 10 (e.g., a blow out preventer).

Figure 10:
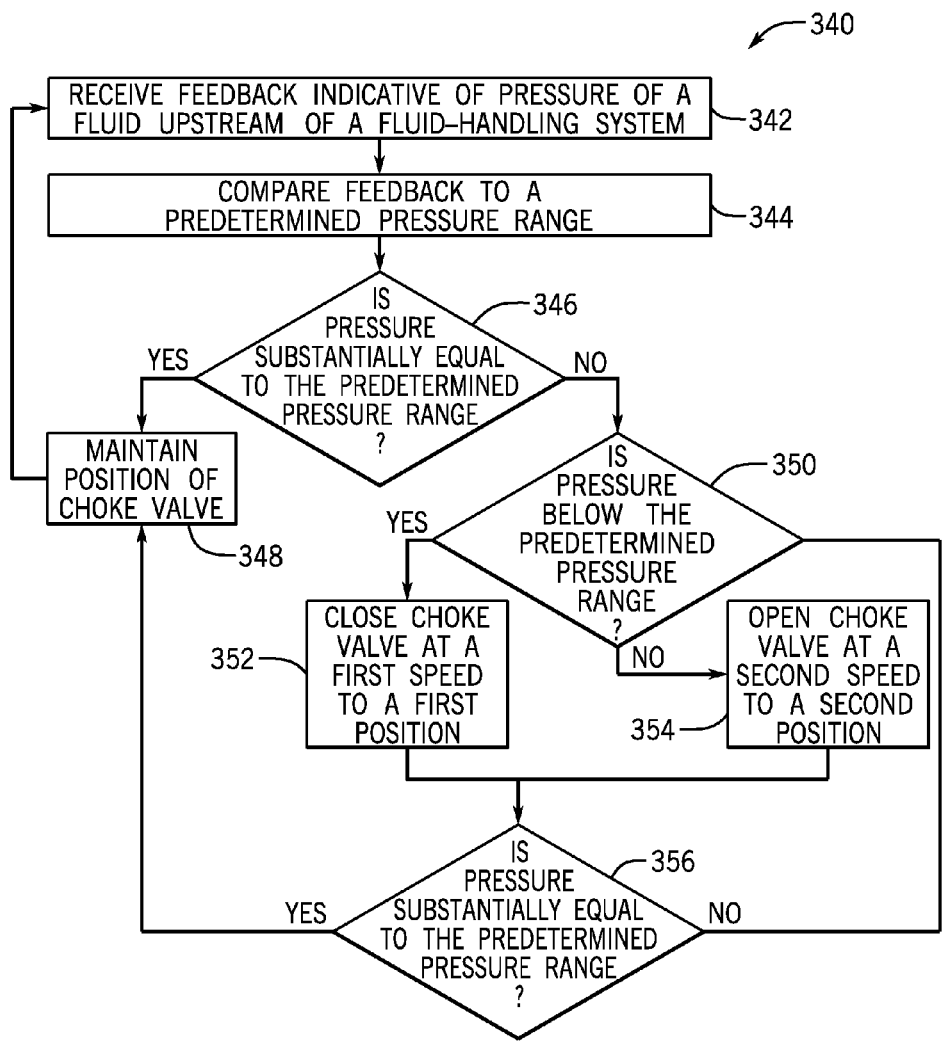
FIG. 10 is a flow diagram of an embodiment of a process that the controller may execute to adjust the position of the choke valve of FIG. 1 using the VFD, in accordance with an aspect of the present disclosure.

Additionally, in some embodiments, it may be desirable to continuously adjust the speed in real time based on feedback or a predetermined speed profile at which the actuator 24 opens and/or closes the choke valve 14. For example, FIG. 10 is a flow chart of an embodiment of a process 340 configured to open and/or close the choke valve 14 at varying speeds (e.g., the variable speed control mode 264) to achieve a desired pressure of the fluid upstream of the fluid-handling system 10.

At block 342, the control device 250 may receive feedback indicative of the pressure of the fluid upstream of the fluid-handling system 10 (e.g., from a pressure transducer or other pressure monitoring device). At block 344, the control device 250 may be configured to compare the pressure of the fluid upstream of the fluid-handling system 10 to a predetermined pressure range. For example, it may be desirable to maintain the pressure of the fluid upstream of the fluid-handling system 10 at a certain level such that conditions in a wellbore are substantially consistent throughout drilling operations. At block 346, the control device 250 may determine whether the pressure of the fluid upstream of the fluid-handling system 10 is substantially equal to (e.g., within five percent of) the predetermined pressure range (e.g., substantially equal to a low pressure threshold of the predetermined pressure range and/or a high pressure threshold of the predetermined pressure range). At block 348, when the pressure of the fluid upstream of the fluid-handling system 10 is substantially equal to (e.g., within five percent of) the predetermined pressure range, the control device 250 may not take action, such that a position of the choke valve 14 is maintained.

However, at block 350, when the pressure of the fluid upstream of the fluid-handling system 10 is not substantially equal to (e.g., within five percent, within ten percent, within fifteen percent of) the predetermined pressure range, the control device 250 may be configured to determine whether the pressure of the fluid upstream of the fluid-handling system 10 is below the predetermined pressure range. In other embodiments, the control device 250 may be configured to determine whether the pressure of the fluid upstream of the fluid-handling system 10 is above the predetermined pressure range. In still further embodiments, the control device 250 may be configured to determine whether pressure of the fluid upstream of the fluid-handling system 10 is either above the predetermined pressure range and/or below the predetermined pressure range.

At block 352, when the control device 250 determines that the pressure of the fluid upstream of the fluid-handling system 10 is below the predetermined pressure range (e.g., a lower threshold of the predetermined pressure range), the control device 250 may send one or more signals to the VFD 31 and/or the actuator 24 to close the choke valve 14 (e.g., adjust the choke valve 14 to a first position that may lead to an increase in pressure of the fluid upstream of the fluid-handling system 10). For example, the control device 250 may send a signal to the VFD 31 to adjust the choke trim 22 to the first position at a first speed. Accordingly, the VFD 31 may send electricity at a first frequency to the motor 27 included the actuator 24 to operate at a predetermined speed, such that the actuator 24 moves the choke trim 22 at the first speed toward the first position.

The first speed (e.g., a speed profile and/or a speed curve) may be based at least on a difference between the predetermined pressure range and the pressure of the fluid upstream of the fluid-handling system 10 (e.g., determined from the feedback received by the control device 250). In some embodiments, the first speed (e.g., a speed profile and/or a speed curve) may increase as the difference between the predetermined pressure range and the pressure of the fluid upstream of the fluid-handling system 10 increases (e.g., the choke valve 14 is configured to move to the first position faster as the pressure of the fluid upstream of the fluid-handling system 10 grows further from the predetermined pressure range). Similarly, the first speed (e.g., a speed profile and/or a speed curve) may decrease as the difference between the predetermined pressure range and the pressure of the fluid upstream of the fluid-handling system 10 decreases (e.g., the choke valve 14 is configured to move to the first position slower as the pressure of the fluid upstream of the fluid-handling system 10 approaches the predetermined pressure range).

Similarly, at block 354, when the control device 250 determines that the pressure of the fluid upstream of the fluid-handling system 10 is not below the predetermined pressure range, the control device 250 may conclude that the pressure of the fluid upstream of the fluid-handling system 10 is above the predetermined pressure range (e.g., the high pressure threshold of the predetermined pressure range). Accordingly, the control device 250 may send one or more signals to the VFD 31 and/or the actuator 24 to open the choke valve 14 toward a second position (e.g., opening the choke valve 14 may reduce the pressure of the fluid upstream of the fluid-handling system 10). For example, the control device 250 may send a signal to the VFD 31 to adjust the choke valve 14 to the second position at a second speed. Accordingly, the VFD 31 may send electricity at a second frequency to the motor 27 included in the actuator 24 to operate at a predetermined speed, such that the actuator 24 adjusts the choke valve 14 to the second position at the second speed.

The second speed (e.g., a speed profile and/or a speed curve) may be based at least on a difference between the pressure of the fluid upstream of the fluid-handling system 10 (e.g., determined from the feedback received by the control device 250) and the predetermined pressure range (e.g., the high pressure threshold of the predetermined pressure range). In some embodiments, the second speed (e.g., a speed profile and/or a speed curve) may increase as the difference between the pressure of the fluid upstream of the fluid-handling system 10 and the predetermined pressure range increases (e.g., the choke valve 14 is configured to move to the second position faster as the pressure of the fluid upstream of the fluid-handling system 10 grows further from the predetermined pressure range). Similarly, the second speed (e.g., a speed profile and/or a speed curve) may decrease as the difference between the pressure of the fluid upstream of the fluid-handling system and the predetermined pressure range decreases (e.g., the choke valve 14 is configured to move to the second position slower as the pressure of the fluid upstream of the fluid-handling system 10 approaches the predetermined pressure range).

Further, at block 356, the control device 250 may be configured to compare the pressure of the fluid upstream of the fluid-handling system 10 to the predetermined pressure range when the choke valve 14 is at the new position. If the pressure of the fluid upstream of the fluid-handling system 10 is substantially equal to the predetermined pressure range, the control device 250 may take no action, such that the position of the choke valve 14 is maintained. However, if the pressure of the fluid upstream of the fluid-handling system 10 is not substantially equal to the predetermined pressure range, the control device may return to block 350 to adjust a position of the choke valve at a third speed such that the pressure of the fluid may reach the predetermined pressure range.

Figure 11:
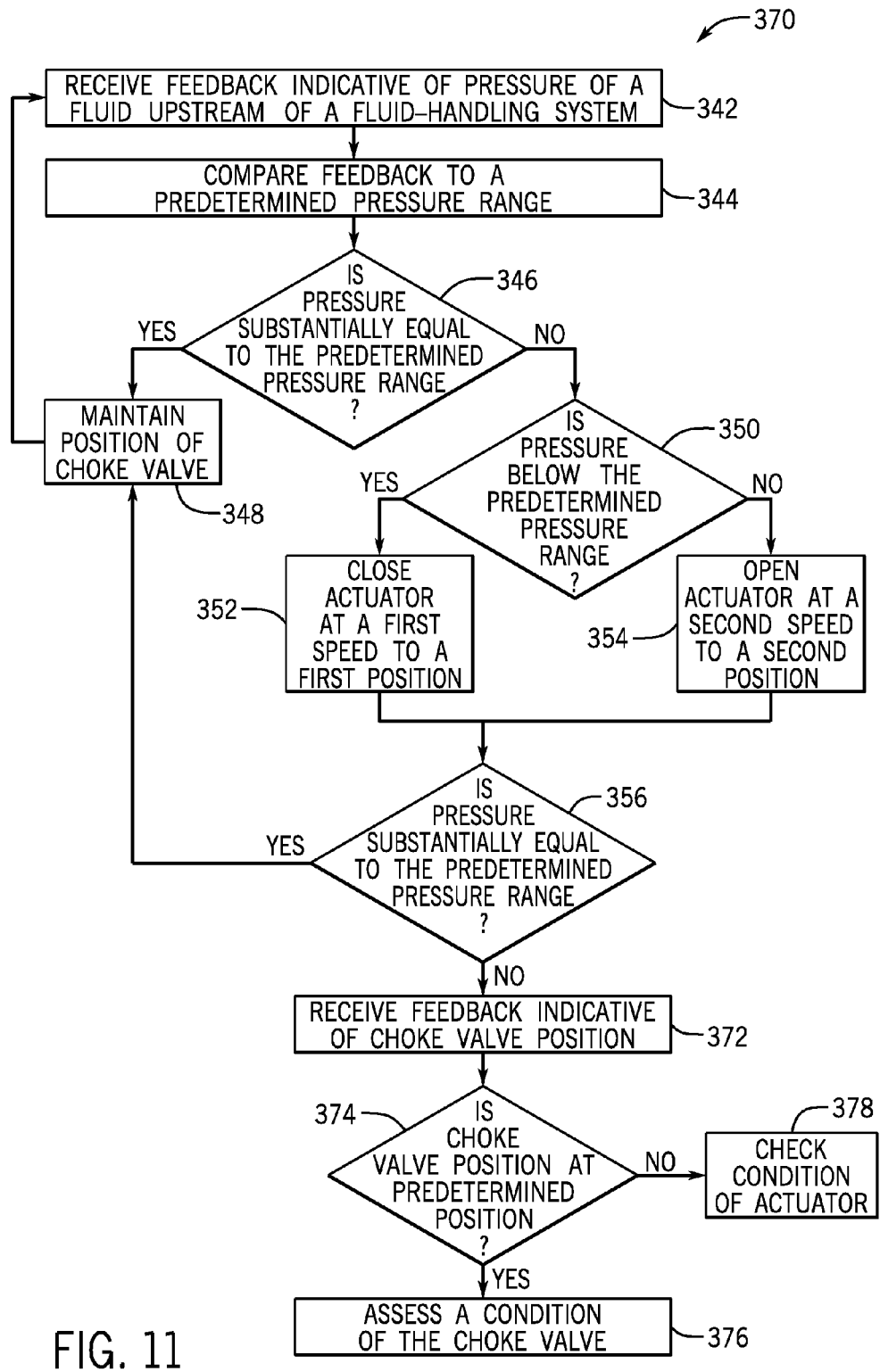
FIG. 11 is a flow diagram of an embodiment of a process that the controller may execute to determine a condition of the choke valve, in accordance with an aspect of the present disclosure.

As discussed above, it may be desirable to monitor adjustments of the choke valve 14 with the VFD 31 to determine a condition of the choke valve 14 (e.g., an amount of wear on the choke valve 14). For example, FIG. 11 is a flow chart of an embodiment of a process 370 that may be utilized to determine a condition of the choke valve 14 (e.g., the choke valve wear mode 266). In some embodiments, the process 370 may be substantially similar to the process 340 with additional steps that may enable the control device 250 to determine a condition of the choke valve 14. For example, when the control device 250 determines that the pressure of the fluid upstream of the fluid-handling system 10 is not substantially equal to the predetermined pressure set point at block 356, the control device 250 may then receive feedback from a position sensor indicative of a position of the choke trim 22 in the choke valve 14, as shown at block 372.

At block 374, the control device 250 may determine whether the position of the choke trim 22 in the choke valve 14 is in a predetermined position. For example, the predetermined position of the choke trim 22 may be based at least on the predetermined pressure range of the fluid upstream of the fluid-handling system 10. In certain embodiments, the control device 250 may also take in other operating parameters of the system when adjusting the position of the choke trim 22 to a new position corresponding to a given pressure of the fluid upstream of the fluid-handling system 10. Accordingly, the control device 250 may be configured to compare the position of the choke trim 22 in the choke valve 14 to the predetermined position of the choke valve 14 for the predetermined pressure range.

If the control device 250 determines that the position of the choke trim 22 is substantially equal to (e.g., within five percent, within ten percent, within fifteen percent of) the predetermined position, the control device 250 may determine that wear has occurred to the choke valve 14, as shown at block 376. In certain embodiments, when the choke trim 22 is in the predetermined position, but the pressure of the fluid upstream of the fluid-handling system 10 is not substantially equal to (e.g., within five percent, within ten percent, within fifteen percent of) the predetermined pressure range, wear may have occurred to the choke valve 14 (e.g., the choke trim 22 is in the proper position, but the choke valve 14 is not achieving the desired result). Accordingly, the operator of the fluid-handling system 10 may determine whether maintenance should be performed on the choke valve 14.

However, when the position of the choke trim 22 is not in the predetermined position and the pressure of the fluid upstream of the fluid-handling system 10 is not substantially equal to (e.g., within five percent of) the predetermined pressure range, the actuator 24 may not be moving the position of the choke valve 14 effectively (e.g., one or more components of the actuator 24 and/or the choke valve 14 are sticking). Accordingly, in such situations, the condition of the actuator 24 and/or connections between the actuator 24 and the choke valve 14 may be assessed to determine whether such components are functioning properly to adjust the position of the choke valve 14.

Additionally, in some embodiments, when the control device 250 determines the condition of the choke valve 14, the control device 250 may be configured to adjust parameters of the other control modes 256, 258, 260, 262, and/or 264 to account for the wear experienced by the choke valve 14. For example, when the control modes 256, 258, 260, 262, and/or 264 include predetermined speed profiles that adjust the position of the choke valve 14, the control device 14 may alter such speed profiles based on the condition of the choke valve 14 determined at block 376.

Moreover, the control device 250 may be configured to adjust signals sent to the VFD 31 and/or the actuator 24 in real time based on the condition of the choke valve 14. For example, the control device 250 may utilize feedback indicative of operating parameters of the system to learn the speeds and/or speed profile at which the position of the choke valve 14 should be adjusted to minimize wear. The control device may thus alter speeds and/or speed profiles of the control modes to minimize wear that may occur to the choke valve 14 based on current operating conditions (e.g., fluid viscosity, solids content, gas content, liquid content, water/moisture content, etc.) of the system. Accordingly, a life of the choke valve 14 may be extended by minimizing wear to the choke valve 14.

Additionally, it should be noted that while the present discussion focuses on adjusting a position of a single choke valve 14, embodiments of the present disclosure may apply to fluid-handling systems 10 that include more than one choke valve 14.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising: a choke valve;
a single actuator coupled to the choke valve and configured to adjust a position of the choke valve to control a flow rate of fluid from a wellbore;
a variable frequency drive coupled to the single actuator and configured to adjust a speed at which the single actuator adjusts the position of the choke valve; and a controller configured to:
receive first feedback indicative of a fluid pressure upstream of the choke valve;
compare the first feedback indicative of the fluid pressure upstream of the choke valve to a first predetermined pressure range;
instruct the variable frequency drive to send electricity to the single actuator at a first frequency when the first feedback indicative of the fluid pressure upstream of the choke valve is outside of the first predetermined pressure range, wherein the variable frequency drive is configured to control a speed of movement and a direction of the single actuator such that the single actuator adjusts the position of the choke valve to a first position at a first speed of movement, and wherein the first speed of movement is based at least on a difference between the first feedback indicative of the fluid pressure upstream of the choke valve and the first predetermined pressure range;
receive second feedback indicative of the fluid pressure upstream of the choke valve after the single actuator adjusts the position of the choke valve at the first speed of movement;
compare the second feedback indicative of the fluid pressure upstream of the choke valve to the first predetermined pressure range;
receive third feedback indicative of a position of the choke valve when the second feedback indicative of the fluid pressure upstream of the choke valve is outside of the first predetermined pressure range;
compare the third feedback indicative of the position of the choke valve to a predetermined choke valve position; and
determine a condition of the choke valve when the third feedback indicative of the position of the choke valve is substantially equal to the predetermined choke valve position.

2. The system of claim 1, wherein the controller is configured to:
compare the first feedback indicative of the fluid pressure upstream of the choke valve to a second predetermined pressure range when the first feedback indicative of the fluid pressure upstream of the choke valve is outside of the first predetermined pressure range; and
instruct the variable frequency drive to send electricity to the single actuator at a second frequency when the first feedback indicative of the fluid pressure upstream of the choke valve is outside of the second predetermined pressure range, wherein the variable frequency drive is configured to control the speed of movement and the direction of the single actuator such that the single actuator adjusts the position of the choke valve to a second position at a second speed of movement, and wherein the second speed of movement is different from the first speed of movement and is based at least on a difference between the first feedback indicative of the fluid pressure upstream of the choke valve and the second predetermined pressure range.

3. The system of claim 1, wherein the controller is configured to instruct the variable frequency drive, the single actuator, or both to maintain a position of the choke valve when the first feedback indicative of the fluid pressure upstream of the choke valve is within the first predetermined pressure range.

4. The system of claim 1, wherein the controller is configured to:
receive second feedback indicative of the fluid pressure upstream of the choke valve after the single actuator adjusts the position of the choke valve at the first speed of movement;
compare the second feedback indicative of the fluid pressure upstream of the choke valve to the first predetermined pressure range; and
instruct the variable frequency drive to send electricity to the single actuator at a second frequency when the second feedback indicative of the fluid pressure upstream of the choke valve is outside of the first predetermined pressure range, wherein the variable frequency drive is configured to control the speed of movement and the direction of the single actuator such that the single actuator adjusts the position of the choke valve to a second position at a second speed of movement, and wherein the second speed of movement is based at least on a difference between the second feedback indicative of the fluid pressure upstream of the choke valve and the first predetermined pressure range.

5. The system of claim 1, wherein the predetermined choke valve position is based at least on the first predetermined pressure range.

6. The system of claim 1, wherein the variable frequency drive and the single actuator are coupled to a shared power supply.

7. The system of claim 1, wherein the variable frequency drive is coupled to the controller via a communications bus of a mineral extraction system.

8. The system of claim 1, wherein the choke valve is a gate and seat choke valve.

9. The system of claim 1, wherein the choke valve is a floating sleeve choke valve.

10. A system, comprising:
a controller configured to:
receive first feedback indicative of a fluid pressure upstream of a choke valve, wherein a position of the choke valve is configured to be adjusted by a single actuator coupled to the choke valve;
compare the first feedback indicative of the fluid pressure upstream of the choke valve to a first predetermined pressure range;
instruct a variable frequency drive coupled to the single actuator to send electricity to the single actuator at a first frequency when the feedback indicative of the fluid pressure upstream of the choke valve is outside of the first predetermined pressure range, wherein the single actuator is instructed to adjust the position of the choke valve to a first position at a first speed of movement, and wherein the first speed of movement is based at least on a difference between the feedback indicative of the fluid pressure upstream of the choke valve and the first predetermined pressure range;
receive second feedback indicative of the fluid pressure upstream of the choke valve after the single actuator adjusts the position of the choke valve at the first speed of movement;
compare the second feedback indicative of the fluid pressure upstream of the choke valve to the first predetermined pressure range;
receive third feedback indicative of a position of the choke valve when the second feedback indicative of the fluid pressure upstream of the choke valve is outside of the first predetermined pressure range;
compare the third feedback indicative of the position of the choke valve to a predetermined choke valve position; and
determine a condition of the choke valve when the third feedback indicative of the position of the choke valve is substantially equal to the predetermined choke valve position.

11. The system of claim 10, wherein the controller is configured to:
compare the first feedback indicative of the fluid pressure upstream of the choke valve to a second predetermined pressure range when the first feedback indicative of the fluid pressure upstream of the choke valve is outside of the first predetermined pressure range; and
instruct the variable frequency drive to send electricity to the single actuator at a second frequency when the first feedback indicative of the fluid pressure upstream of the choke valve is outside of the second predetermined pressure range, wherein the single actuator is instructed to adjust the position of the choke valve to a second position at a second speed of movement, and wherein the second speed of movement is different from the first speed of movement and is based at least on a difference between the first feedback indicative of the fluid pressure upstream of the choke valve and the second predetermined pressure range.

12. The system of claim 10, wherein the controller is configured to instruct the variable frequency drive, the single actuator, or both to maintain a position of the choke valve when the first feedback indicative of the fluid pressure upstream of the choke valve is within the first predetermined pressure range.

13. The system of claim 10, wherein the controller is configured to:
receive second feedback indicative of the fluid pressure upstream of the choke valve after the single actuator adjusts the position of the choke valve at the first speed of movement;
compare the second feedback indicative of the fluid pressure upstream of the choke valve to the first predetermined pressure range; and
instruct the variable frequency drive to send electricity to the single actuator at a second frequency when the second feedback indicative of the fluid pressure upstream of the choke valve is outside of the first predetermined pressure range, wherein the single actuator is instructed to adjust the position of the choke valve to a second position at a second speed of movement, and wherein the second speed of movement is based at least on a difference between the second feedback indicative of the fluid pressure upstream of the choke valve and the first predetermined pressure range.

14. A method, comprising:
receiving, via a sensor, first feedback indicative of a fluid pressure upstream of a choke valve from the sensor;
comparing the first feedback indicative of the fluid pressure upstream of the choke valve to a first predetermined pressure range;
maintaining a position of a choke valve when the first feedback indicative of the fluid pressure upstream of the choke valve is within the first predetermined pressure range; and
adjusting a position of the choke valve to a first position at a first speed of movement when the first feedback indicative of the fluid pressure upstream of the choke valve is outside of the first predetermined pressure range, wherein adjusting the position of the choke valve comprises sending electricity at a first frequency from a variable frequency drive to a single actuator configured to adjust the position of the choke valve to the first position, wherein the variable frequency drive is configured to instruct the single actuator to adjust the choke valve at the first speed of movement, and wherein the first speed of movement is based at least on a difference between the first feedback indicative of the pressure of the fluid upstream of the choke valve and the first predetermined pressure range;
receiving second feedback indicative of the fluid pressure upstream of the choke valve after the single actuator adjusts the position of the choke valve at the first speed of movement;
comparing the second feedback indicative of the fluid pressure upstream of the choke valve to the first predetermined pressure range;
receiving third feedback indicative of a position of the choke valve when the second feedback indicative of the fluid pressure upstream of the choke valve is outside of the first predetermined pressure range;
comparing the third feedback indicative of the position of the choke valve to a predetermined choke valve position; and
determining a condition of the choke valve when the third feedback indicative of the position of the choke valve is substantially equal to the predetermined choke valve position.

15. The method of claim 14, comprising:
comparing the first feedback indicative of the fluid pressure upstream of the choke valve to a second predetermined pressure range when the first feedback indicative of the fluid pressure upstream of the choke valve is outside of the first predetermined pressure range; and
sending electricity at a second frequency from the variable frequency drive to the single actuator to adjust the position of the choke valve to a second position at a second speed of movement when the first feedback indicative of the fluid pressure upstream of the choke valve is outside of the second predetermined pressure range, wherein the variable frequency drive is configured to instruct the single actuator to adjust the choke valve at the second speed of movement, and wherein the second speed of movement is based at least on a difference between the first feedback indicative of the pressure of the fluid upstream of the choke valve and the second predetermined pressure range.

16. The method of claim 14, comprising instructing the variable frequency drive, the single actuator, or both to maintain a position of the choke valve when the first feedback indicative of the fluid pressure upstream of the choke valve is within the first predetermined pressure range.

17. The method of claim 14, comprising:
receiving second feedback indicative of the fluid pressure upstream of the choke valve after the single actuator adjusts the position of the choke valve at the first speed of movement;
comparing the second feedback indicative of the fluid pressure upstream of the choke valve to the first predetermined pressure range; and
sending electricity at a second frequency from the variable frequency drive to the single actuator to adjust the position of the choke valve to a second position at a second speed of movement when the second feedback indicative of the fluid pressure upstream of the choke valve is outside of the first predetermined pressure range, wherein the variable frequency drive is configured to instruct the single actuator to adjust the choke valve at the second speed of movement, and wherein the second speed of movement is based at least on a difference between the second feedback indicative of the pressure of the fluid upstream of the choke valve and the first predetermined pressure range.

* * * * *